United States Patent
Decker et al.

[15] 3,686,531
[45] Aug. 22, 1972

[54] FAULT LOCATING SYSTEM FOR ELECTRICAL CIRCUITS

[72] Inventors: Robert M. Decker, 8114 Covington Ave., Parma, Ohio 44129; Michael D. Patena, 6058 Andover Road, Garfield Heights, Ohio 44125; Thomas G. White, 12974 Emerson Ave., Lakewood, Ohio 44107

[22] Filed: April 8, 1971

[21] Appl. No.: 132,271

[52] U.S. Cl.............317/27 R, 324/52, 340/253 A, 340/253 P, 340/248 R
[51] Int. Cl............................................H02h 3/30
[58] Field of Search........324/52; 340/253 A, 253 B, 253 P, 340/255, 248 E, 248 R, 253 R; 317/27 C

[56] References Cited

UNITED STATES PATENTS

| | | |
|---|---|---|
| 1,105,883 | 8/1914 | Creighton.....................324/52 |
| 3,171,112 | 2/1965 | Martin....................340/253 R |
| 2,709,800 | 5/1955 | Temple......................324/127 |
| 3,443,158 | 5/1969 | Arndt......................324/52 X |

Primary Examiner—J. D. Miller
Assistant Examiner—Harvey Fendelman
Attorney—Meyer, Tilberry & Body

[57] ABSTRACT

A fault locating system for electrical circuits consisting of three major components, a fault sensor, a control circuit or channel, and an indicating device. The fault sensors indicate an abnormal current flow when a fault occurs and transmit the information through the control circuit or channel to the indicating device which in turn displays the information. The control circuit connects the fault sensors in series or parallel, and the sensors are oriented in spaced relationship along the cable or electrical circuit being monitored so that fault detection between adjacent sensors is determined by the indicating device. The system may be set up for automatic resetting. The preferred sensor is a magnetic reed switch, and the fault indicator preferably incorporates a circuit with fast response.

7 Claims, 12 Drawing Figures

Patented Aug. 22, 1972

INVENTORS
ROBERT M. DECKER
MICHAEL D. PATENA
THOMAS G. WHITE

BY

*Meyer, Tilberry & Body*

ATTORNEYS

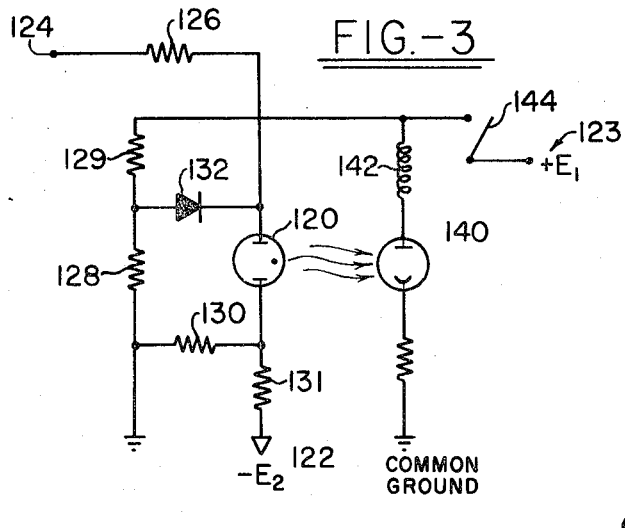
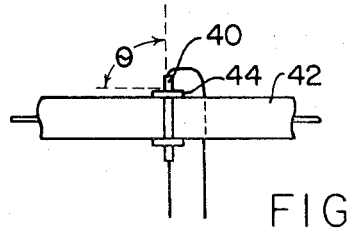
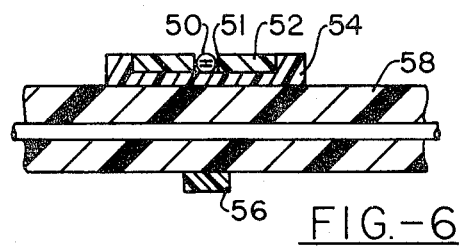
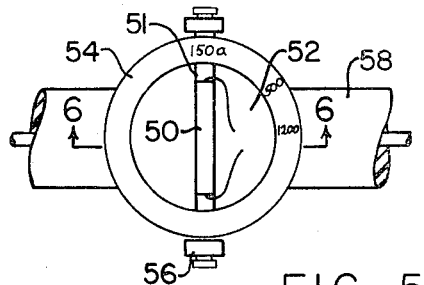
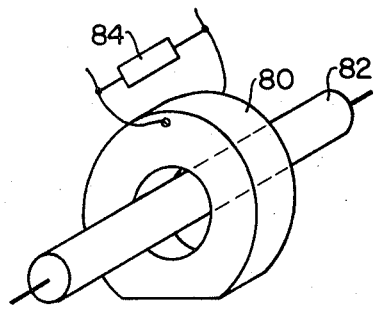
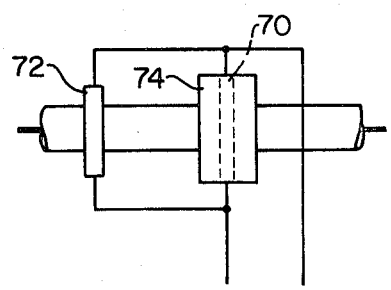
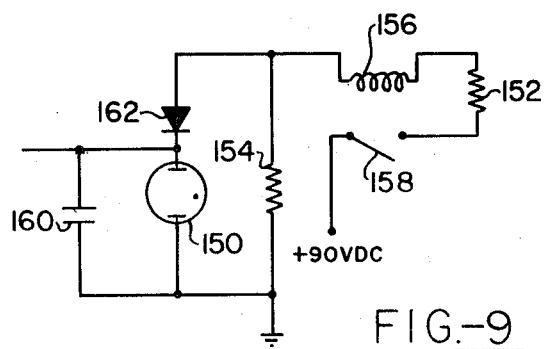
INVENTORS
ROBERT M. DECKER
MICHAEL D. PATENA
THOMAS G. WHITE
BY
*Meyer, Tilberry & Body*
ATTORNEYS

INVENTORS
ROBERT M. DECKER
MICHAEL D. PATENA
THOMAS G. WHITE

BY
*Moyer, Tilberry & Body*
ATTORNEYS

FAULT LOCATING SYSTEM FOR ELECTRICAL CIRCUITS

Heretofore it has been known that there have been many and various types of fault locating systems for detecting electrical faults in cables or the like so that repair of the fault or replacement of the cable can be more readily accomplished. These prior art systems, however, have been relatively complicated, expensive, and not inherently reliable. Further, they have not been readily adaptable to electrical power lines, and particularly those types of power lines which pass underground from station to station, as it has been extremely difficult to readily detect when and where a fault occurs in an underground electrical cable. Naturally, when the cables are above ground on electric poles, or the like, the location of the fault is normally readily visible and great lengths of cable can be checked by the visual inspection process. However, with an underground cable, visual inspection is not possible, and in addition, whenever insulation breaks down on the underground cable, a fault results. Because of the presence of the cable in the earth, the working of the earth and the action of water, etc., thereon, cable faults due to breakdown of insulation occur rather frequently. Further, more efforts are being made to place cables underground to effect a cleaning up of the environment and to eliminate poles which are unsightly.

Therefore, it is the general object of the present invention to avoid and overcome the complicated, expensive, and unreliable systems of the prior art by the provisions of a fault locating system particularly adapted to be associated with underground electrical cable, and which is extremely simple, yet highly reliable, and which will definitely define the location of the fault along a great length of cable.

A further object of the invention is to provide a fault sensor which is readily adjustable depending upon the current carrying characteristics of the cable with which it is associated so that it might readily adapt to various current capacities.

A further object of the invention is to provide a fault sensor utilizing a magnetic reed switch positioned in close proximity to the cable being monitored, and which switch will not be actuated upon normal current flow indicating a fault condition.

A further object of the invention is to provide a fault indicating system utilizing a plurality of sensors located at spaced locations along a cable to be monitored, and with a control circuit associated therewith to immediately detect between which adjacent sensors a fault occurs, and indicate at a master control box the location where the fault occurs.

A further object of the invention is to provide a fault locating system which is adaptable for an AC or DC circuit and which utilizes a radiant energy photo coupling device to prevent damage to a visual indicator and other parts of the circuit in cases where high voltage could be introduced into the control circuit by the fault.

The aforesaid objects and other objects of the invention which will appear as the invention is illustrated and described hereinafter are achieved by providing a fault locating system for electrical circuits which comprises an electrical cable, a plurality of fault sensors located in spaced relation along the cable, a control circuit connecting the fault sensors electrically, and an indicating device actuated by the control circuit to indicate if a fault in the cable occurs and between what adjacent sensors the fault does occur.

For a better understanding of the invention, reference should be had to the accompanying drawings wherein;

FIG. 1 there is an electrical schematic illustrating the overall principle of the circuit of the invention associated with two electrical feed cables from a main riser;

FIG. 3 is an enlarged electrical schematic of a type of indicator circuit that could be used in FIG. 2;

FIG. 4 is an enlarged plan view of the preferred sensor comprising a magnetic reed switch associated with the cable;

FIG. 5 is a modified embodiment of a sensor utilizing a magnetic reed switch associated with the cable;

FIG. 6 is a broken-away enlarged cross-sectional view of the sensor element of FIG. 5 taken on line 6—6 thereof;

FIG. 7 is a modified sensor element;

FIG. 8 is another modification of a sensor element;

FIG. 9 is a circuit diagram of a modified indicator circuit;

Figure 1:
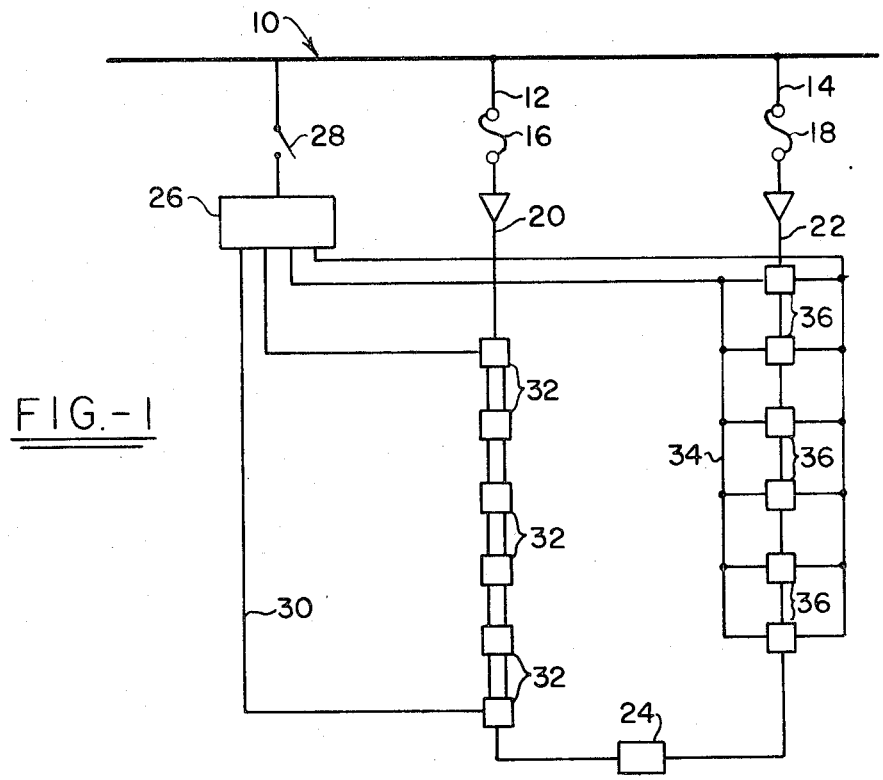

With reference to FIG. 1, the numeral 10 indicates generally a main electrical power transmission line from which feeder trunk lines 12 and 14 are directed to feed through appropriate fuses 16 and 18, respectively, for feeding subterranean cables 20 and 22. The cables 20–22 in the normal electrical system will be between 1 to 5 miles in length, and it is normally from these main feeder cables that individual lines are fed to residences, small businesses, or the like. Preferably the cables 20 and 22 will terminate in a common junction box which is conventional for this type of main cable, sub-cable setup.

The invention preferably consists of a fault locating system for the sub-cables 20 and 22, as these compose the heart of the underground system, and any break in these cables or fault in the insulation can short the overall system, blow fuses 16 and 18 and cause a loss of power to a large segment of the community. The ability to rapidly determine where such faults occur and to be able to bypass the faults and return the service as promptly as possible is important to the user and saves money for the electric company.

To this end, the invention contemplates an indicator circuit control box 26, that is supplied energy from a suitable low voltage supply. The fault locating circuit is illustrated for cable 20 generally by the numeral 30, and incorporates a plurality of series-connected sensors 32 associated in close proximity with the cable 20 as indicated. The fault detecting circuit associated with cable 22 is illustrated generally by numeral 34, and it can be seen in this instance that the sensors indicated by numeral 36 are connected in parallel. The specifics of the sensors 32 and 36 and the circuits 30 and 34 will be more fully defined hereinbelow.

Also, it should be understood that while circuits 30 and 34 are indicated as separate circuits operating out of the same control box 26, they might operate independently from separate control boxes, or they might both operate from the same control box and the same circuit within the control box by simple switching means utilizing a portion of time to check the circuit 30, for example, and a subsequent period of time to check the circuit 34. In other words, the control box 26, as more fully defined hereinbelow, might be common to both circuits 30 and 34, or it might be a separate component.

Hence, it should be understood that the invention is a system consisting of three major components; namely, (1) fault sensors associated in spaced relationship with a cable or an electrical conductor to be monitored, (2) a control circuit or channel to carry the electrical indication from the sensor to, (3) an indicating device normally associated with the control circuit. In the normal operation as defined hereinafter, all sensors up to the point where the fault occurs will indicate a surge of current flow, while all those indicators past the fault location will not indicate such a surge. This information is transmitted via the circuits 30 and 34 to the control box 26 where an appropriate indicator is actuated so that it is clear that the fault has occurred between the last sensor to be actuated by the high current flow and the adjacent sensor which has not been actuated because abnormally high current flow was not detected therein.

FAULT SENSOR

The invention contemplates that the fault sensor should be a device which changes its characteristics abruptly when the current level on the electrical conductor being monitored exceeds a predetermined amount. The preferred type of sensor is a magnetic reed switch illustrated generally by numeral 40 in FIG. 4. Here the switch 40 is held in a normal or substantially perpendicular relation to a conductor 42 by an appropriate clamp 44 so that the angle $\theta$ representing the angle between the axis of the reed switch and the axis of the conductor is approximately 90°. This relationship of the magnetic reed switch to the conductor best uses the magnetic field surrounding the conductor when current flows therethrough so that only relatively small increases in current flow will actuate the magnetic reed switch. These reed switches 40 are well known to those skilled in the art, and come in all different sizes and actuating ranges, and to pick the right component switch for the job would be a matter easily within the capability of one skilled in the art. Suffice it to say that in the system indicated in FIG. 1, the normal ampere current load through the cables 20 and 22 will be about 130 amps, and the current needed to actuate switch 40 should preferably be at least two to three times this normal amount.

It should also be understood that when a fault occurs in the cable, it in effect simply grounds the cable so that instantaneously, there is an extremely high current flow through the cable caused by this short circuit which will continue in an AC circuit of this type for perhaps one-half cycle until the respective fuse associated with the cable is blown, as for example, the fuses 16 and 18 in cables 20 and 22 in FIG. 1. For conventional distribution, 60 cycle AC circuits associated with homes and businesses throughout the United States, this would amount to a time period of at least 0.008 seconds in which the high current surge would be present in the cable. This 0.008-second period is the length of time that the reed switch 40 would be closed upon the current surge.

FIG. 5 represents a modified embodiment of the sensor FIG. 4 which includes a reed switch 50 mounted in a slot 51 in a dielectric disc 52, which disc 52 is rotatably carried in a body 54. Body 54 is mounted by a rubber strap or the like 56 around a cable 58. FIG. 5 illustrates disc 52 in a position so that the reed switch 50 is in the same angular relationship to cable 58 as is illustrated in FIG. 4 which would be the proper position where cable 58 was normally carrying a 150-amps current load. The same reed switch 50 would be adaptable to a cable carrying 500 or 1200 amps, for example, by simply rotating disc 52 in body 54 until the slot aligns with the 500-amp marker where angle $\theta$ would equal approximately 45° or to the 1200-amp marker where angle $\theta$ would equal approximately 0° and in effect the reed switch 50 would be nearly aligned with the axis of cable 58. It should also be noted that the tripping current for the reeds may be varied further by changing the distance of the reed from the current carrying conductor.

If the high-speed indicator is used on an AC power system, the opening and closing of the reed as it follows the sine wave will not be detrimental. However, on a slower speed system where the opening and closing of the reed switch as it follows the alternations of the 60 hertz AC fault current is undesirable, the embodiment of FIG. 8 of the invention might be utilized which simply incorporates an additional reed switch 70 connected in parallel with a first reed switch 72 and surrounding by a lag coil 74, which as understood by those skilled in the art would simply amount to a hollow copper cylinder of considerable sidewall thickness. This circuit does not follow the AC sine wave 20. However, addition of the core does reduce the range of pickup currents and ease of adjustment of the system for various pickup currents.

A saturating current transformer 80, as seen in FIG. 7, might also be utilized as a suitable sensing device. The transformer 80 surrounds a cable 82 and incorporates a voltage limiting device, such as diac 84.

Figure 2:
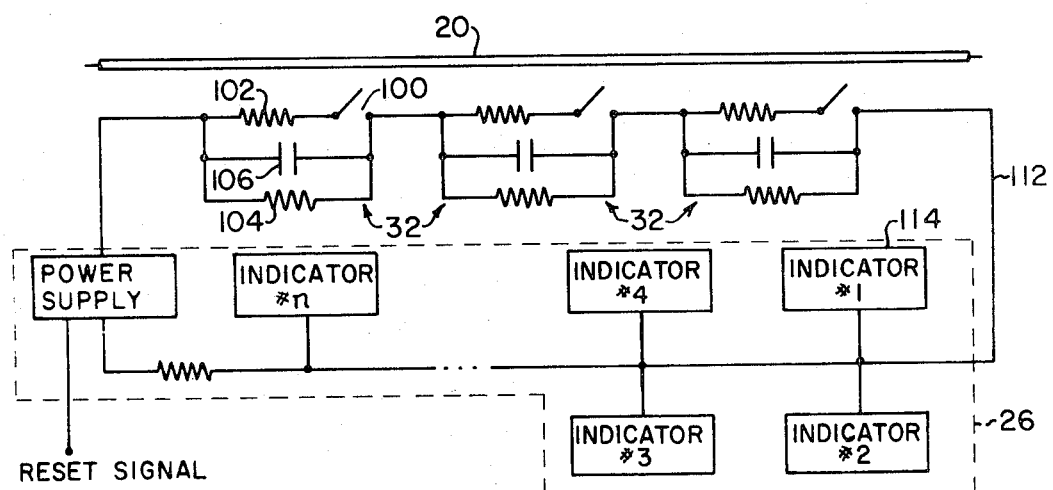
FIG. 2 is an electrical schematic diagram of one form of the series shown in FIG. 1, illustrating in more detail the basic components thereof.

However, the preferred sensing device of the invention is illustrated in an overall circuit schematic shown in FIG. 2 which relates to the circuit of FIG. 1, and similar numerals are used on the same components. Specifically, the sensors 32 each comprise a reed switch 100, a pair of resistors 102, and 104 connected in parallel around switch 100 with resistor 102 also including a capacitor 106 in a parallel circuit around reed switch 100.

The suggested value and need for the resistors and capacitor in association with the reed switch 100 will be more fully defined hereinafter.

INDICATOR

The indicating device must take the signal provided by the fault sensor and provide a visual indication of which fault sensors "saw" the fault. The input signal to the fault sensor will be one of a plurality of $n$ different voltage or current levels where $n$ is the number of different sensors. This can be best understood with reference to FIG. 2. As explained above, when a fault occurs, there will be a surge of current causing the closing of every reed switch up to the point where the fault occurs in the cable 20. A predetermined voltage is supplied by a power supply 110 to the series connected sensors, and the fact that each of the resistors 104 has caused some voltage drop to occur down through the number of sensors in the line, the normal voltage at point 112 in FIG. 2 with 20 sensors and a 200-volt initial output from power supply 110 might be nearly 0 volts, if there were a 10-volt drop across resistor 104 for each sensor. Hence, indicator 1, indicated by number 114, might be said to drop out upon an indication of 20 volts which would mean that only the first sensor had its reed switch 100 closed. Similarly, indicators 2 through $n$ would be set to actuate on successive equal voltage increments, and in this way all sensors are directly tied to a respective indicator.

The indicators such as 114 could be any type of device which will indicate, preferably visually, that the fault occurred and remain in the indicating condition, even though the change in voltage is very short in time duration as reed-switches 100 will only be closed for about the one-half cycle time period indicated above. To this end, one form of indicator might comprise a magnet attached to one end of a spring-loader plunger. When the end is depressed, the magnet holds the plunger down to the iron core of a coil surrounding the plunger. When a signal of adequate size and polarity is applied to the coil, it cancels out the effect of the magnet and the spring pulls the plunger away. The plunger would be visible in its released condition until reset either manually or electrically. This type of indicator would be a moderate speed indicator and would definitely have to meet the current pulse requirements for the pulse surge associated with a normal fault.

A dropout indicator with a high input impedance and fast response is illustrated in FIG. 3. This utilizes a neon light 120 which is biased between the breakdown and maintaining voltage of the lamp by a minus $E_2$ source 122 and a plus $E_1$ source identified by numeral 123. The lamp 120 is triggered to the on condition by an extremely short electrical pulse at the input 124. If the pulse is of a magnitude greater than the sum of the lamp breakdown voltage plus the negative bias supplied by source 122 and resistors 130 and 131, the lamp will be switched on. Naturally, the particular negative bias voltage associated with each indicator circuit such as that shown in FIG. 3 is different for each one of the indicators to achieve the sequential actuation depending upon how many sensors have been actuated. Resistor 126 is used to increase the input impedance of the indicator after the lamp 120 has switched on. Resistor 128 and 129 are chosen so that the lamp is biased between breakdown and maintaining voltage. Diode 132 isolates the comparatively low impedance bias network 128 and 129 from the input circuit. Lamp 120 is maintained in the "on" state by current flowing from the biasing network composed of 128 and 129 after it has been turned on by the proper size pulse from the sensors and control circuit. It is preferable that the light 120 be of the type which will have stable breakdown and maintaining voltage and actuate promptly, in other words, within about 10 microseconds. A typical light would preferably be neon, such as NE76 or 5AGA type which are commercially available.

In order to tie the actuation of the light 120 into the actual visual indicator such as the magnetic dropout coil defined above, the invention contemplates that the light 120 drives a photocell 140 which would in turn actuate a coil 142 associated with the switch 144. The coil 142 is the coil of the dropout indicator. The dropping out of the indicator would open switch 144. In typical electrical circuitry, the indicator might be a ground target indicator which would show a particular color when actuated, as is well known in this field. It should further be understood that in this circuit, the properties of the dropout indicator coil 142 are not critical, since they do not influence the bias voltage of the lamp 120. Also, by coupling all the indicators optically to one photocell, it would be possible to derive a signal to activate an automatic reset circuit for the visual indicators.

It should also be understood that it might be possible for the neon lamp itself as the indicator. In this case, the loss of voltage provides an automatic reset. Also, it would be possible to use solid state devices to sense the input voltage or current instead of the neon, if suitable devices are economical and surge resistant. Further, while only a two-element neon indicator is illustrated, a three-element neon indicator would also be a possibility.

FIG. 9 illustrates a modified embodiment of a high input impedance and fast response indicator. Here, a neon light 150 is biased between the breakdown point and the maintaining voltage of the lamp and is triggered on by a short pulse. The triggering level is adjusted by the combination of resistors 152, 154, and the coil 156 of the dropout indicator associated with the switch 158. Here, the inclusion of a capacitor 160 to provide time delay in the actuation might be desirable. A diode 162 is again incorporated into the circuit to isolate the control circuit from the neon bias network.

As indicated above, this circuit does make the turnon voltage of the light 150 dependent upon the characteristics of the dropout indicator coil 156. The circuit connection for this indicator might be the same as for the circuit of FIG. 2.

PARALLEL CIRCUIT

Referring to FIG. 1, it should be understood that the sensors 36 in the parallel circuit 34 could be the same as sensor 32 with components 104 and 106 deleted. This is particularly shown in FIG. 10, and similar components to FIG. 2 are indicated by the same numeral with the suffix a added.

Figure 10:
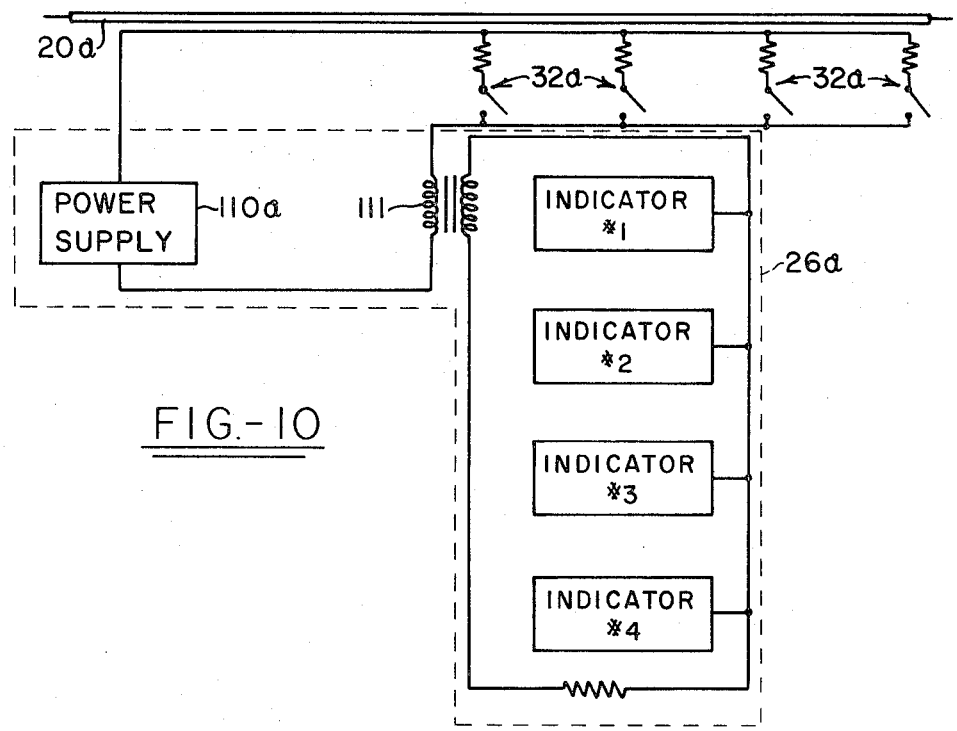
FIG. 10 is an electrical schematic diagram of one form of the parallel circuit shown in FIG. 1, illustrating in more detail the basic components thereof.

Also the indicators would essentially comprise exactly the same circuit setup as shown in FIG. 3. The indicators would be connected to the control circuit as shown in FIG. 10. The addition of a pulse transformer, indicated by numeral 111, is desirable to properly match the impedances of the sensing circuit to the indicators. A resistor 113 provides loading for the transformer 111. Both the transformer 111 and resistor 113 are needed if the indicators are of the high impedance type defined above. If a low impedance indicator is used, the transformer 111 and resistor 113 may be eliminated.

Referring to FIG. 1, it should be understood that the sensors 36 in the parallel circuit 34 could be exactly the same as sensors 32 in the circuit 30.

Also, the indicators would essentially comprise exactly the same circuit setup as shown in FIG. 3. In this way, exactly the same voltage input signal would be treated the same way by the indicators as defined with respect to the series oriented circuit above. In other words, the voltage at point 112 in FIG. 2 would still be indicative of where the fault occurred.

CONTROL CABLE

Figure 11:
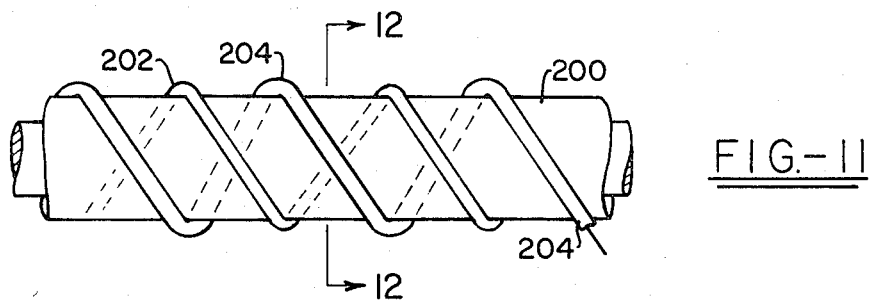
FIG. 11 is a broken-away section of the power cable showing the relation of the concentric neutral and control wires wrapped in spiral convolutions therearound.
Figure 12:
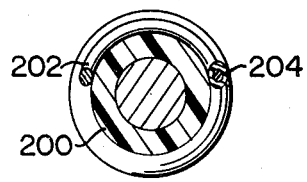
FIG. 12 is a cross-sectional view of the power cable of FIG. 11 taken on line 12—12 thereof.

It has been found economically feasible to insulate two of the concentric neutral wires normally associated with a power cable, and utilize these as the control circuit wires. This is shown in FIGS. 11 and 12 where numeral 200 illustrates the power cable. Numeral 202 illustrates a conventionally spirally wrapped concentric neutral wires, and numeral 204 illustrates illustrates spirally wrapped insulated control circuit wires. The wires 204 when wrapped tightly around the cable 200 with a similar convolution pattern are perfect control circuit wires because all induced voltages cancel. This greatly simplifies the installation of the circuit because the control circuit wires are directly associated with the power cable. It has been found however, that the sensors should be positioned at points on the cable 200 that do not have any concentric neutral wrapped therearound, so that these currents in the neutral don't interfere with the sensor operation.

SUMMARY

Hence, it is seen particularly with respect to FIG. 2 that the capacitors 106 across the reed switch fault detectors are charged to a voltage approximately equal to the supply voltage divided by the number of fault detectors. A fault between the n and n-1 fault detectors causes the first n-1 magnetic reed switches to close thus shorting out the first n-1 capacitors. The shorting of the capacitors causes a voltage pulse of magnitude (n-1 divided by the number of fault detectors) times the supply voltage to appear across the resistor 126 associated with each indicator. This voltage applied to each indicator would thus cause the first n-1 indicator to trip. The firing of the appropriate neon lights in the indicators would occur in about the first 2 to 4 milliseconds of the fault and the mechanical dropout indicator would open somewhat later. A switch contact 144 on the dropout indicator disconnects the circuit from the power source E1, and could start an automatic reset circuit if desired. Reset would be accomplished by returning the plunger on the dropout indicator to its normal position. It is desirable for normal circuit operation that the reed switches 100 will not actuate unless the current flow in the cable 20 is at least two to three times greater than the normal flow, although this of course is dependent on the setting thereof and normal cable currents. Since it takes at least one-half cycle to blow a fuse, and the sensors will operate in several milliseconds, there is plenty of time for the system to operate. The adjustability of the sensor with respect to the cable allows the system to function with various line currents without changing the electrical characteristics of the fault detection circuitry. Although various types of sensors could be utilized, the magnetic reed switch appears to be much preferable, and for a fast response with high input impedance characteristics, a neon light actuating a photocell may be preferable for the indicator circuitry. With respect to FIG. 1, the circuits 30 and 34 provide a signal path to carry information from the sensor back to the indicator, and in normal underground electric cabling, this might simply comprise two strands of the concentric neutral that surround the cable, as long as it were insulated and used for this control link.

In accordance with the Patent statutes, while only the best known embodiments of the invention have been illustrated and described in detail, it is to be particularly understood that the invention is not limited thereto or thereby, but that the inventive scope is defined in the appended claims.

What is claimed is:

1. A fault locating system for electrical circuits which comprises an electrical cable, a plurality of current actuated fault sensors located in spaced relation along the cable;

a control circuit electrically connecting the fault sensors;

an indicating device actuated by the actuation of at least one sensor transmitted through the control circuit to indicate if a fault in the cable occurs and between what adjacent sensors the fault occurs;

each said sensor being a magnetic reed positioned adjacent to the cable with its axis substantially normal to the axis of the cable; and said sensors being connected to the control circuit in series.

2. A fault locating system for electrical circuits which comprises an electrical cable, a plurality of current actuated fault sensors located in spaced relation along the cable;

a control circuit electrically connecting the fault sensors;

an indicating device actuated by the actuation of at least one sensor transmitted through the control circuit to indicate if a fault in the cable occurs and between what adjacent sensors the fault occurs;

each said sensor being a megnetic reed positioned adjacent to the cable with its axis substantially normal to the axis of the cable; and said fault sensors being connected electrically in parallel.

3. A fault locating system for electrical circuits which comprises an electrical cable, a plurality of current actuated fault sensors located in spaced relation along the cable;

a control circuit electrically connecting the fault sensors;

an indicating device for each fault sensor, said indicating device comprising a radiating energy source directly connected to the control circuit and driven to emission by a predetermined voltage signal over the control circuit caused by actuation of its respective sensor; and a photocell positioned adjacent the radiating energy source and actuated thereby, and a mechanical indicator actuated by the photocell.

4. A system according to claim 3 which includes resistance means to control the predetermined voltage actuation level of the radiating energy source, and whereby the resistance means vary between indicators, so that each indicator is associated with a respective sensor and is not actuated unless its associated sensor is actuated.

5. A fault locating system for electrical circuits which comprises:
- an electrical cable, a plurality of current responsive fault sensors located in spaced relation along the cable;
- a plurality of fast-acting indicating devices;
- a control circuit electrically connecting the fault sensors to the indicating devices;
- means to supply a predetermined control voltage to the control circuit; and
- means associated with the sensors to regulate the predetermined voltage upon actuation thereof whereby a respective indicator means is actuated upon actuation of each respective sensor;
- said sensors being electrically connected in series.

6. A fault locating system for electrical circuits which comprises:
- an electrical cable, a plurality of current responsive fault sensors located in spaced relation along the cable;
- a plurality of fast-acting indicating devices;
- a control circuit electrically connecting the fault sensors to the indicating devices;
- means to supply a predetermined control voltage to the control circuit; and
- means associated with the sensors to regulate the predetermined voltage upon actuation thereof whereby a respective indicator means is actuated upon actuation of each respective sensor;
- said sensors being electrically connected in parallel.

7. A fault locating system for electrical circuits which comprises:
- an electrical cable, a plurality of fault sensors located in spaced relation along the cable;
- a plurality of indicating devices;
- a control circuit electrically connecting the fault sensors to the indicating devices;
- means to supply a predetermined control voltage to the control circuits; and
- means associated with the sensors to regulate the predetermined voltage upon actuation thereof, whereby a respective indicator means is actuated upon actuation of each respective sensor;
- said control circuit consisting of a pair of insulated wires tightly wrapped around the cable in convolutions so that induced voltages from the power cable therein cancel each other.

* * * * *